United States Patent
Nicholson

(10) Patent No.: US 6,332,128 B1
(45) Date of Patent: Dec. 18, 2001

(54) SYSTEM AND METHOD OF PROVIDING MULTIPLE LEVEL DISCOUNTS ON CROSS-MARKETED PRODUCTS AND DISCOUNTING A PRICE-PER-UNIT-VOLUME OF GASOLINE

(75) Inventor: G. Randy Nicholson, Abilene, TX (US)

(73) Assignee: AutoGas Systems, Inc., Abilene, TX (US)

( * ) Notice: Subject to any disclaimer, the term of this patent is extended or adjusted under 35 U.S.C. 154(b) by 0 days.

(21) Appl. No.: 09/253,275

(22) Filed: Feb. 19, 1999

Related U.S. Application Data

(60) Provisional application No. 60/093,813, filed on Jul. 23, 1998.

(51) Int. Cl.$^7$ .................................................. G06F 17/60
(52) U.S. Cl. ......................... 705/14; 235/381; 235/375; 235/378; 235/380
(58) Field of Search ............... 705/14, 10, 416; 235/383

(56) References Cited

U.S. PATENT DOCUMENTS

| | | | |
|---|---|---|---|
| 4,949,256 | 8/1990 | Humble | 364/401 |
| 5,008,519 | 4/1991 | Cunningham et al. | 235/383 |
| 5,173,851 | 12/1992 | Off et al. | 364/401 |
| 5,185,695 * | 2/1993 | Pruchnick | 705/14 |
| 5,368,129 | 11/1994 | Von Kohorn | 186/52 |
| 5,420,606 | 5/1995 | Begum et al. | 345/156 |
| 5,483,049 | 1/1996 | Schulze, Jr. | 235/383 |
| 5,502,636 | 3/1996 | Clarke | 364/401 |
| 5,710,886 | 1/1998 | Christensen et al. | 395/214 |
| 6,116,505 * | 9/2000 | Withrow | 705/14 |

FOREIGN PATENT DOCUMENTS

| | | | | |
|---|---|---|---|---|
| 51-1463-A2 * | 4/1992 | (EP) | | G07G/5/00 |
| WO-91/18373 * | 11/1991 | (GB) | | G07F/7/02 |
| WO-96/06415-A1 * | 2/1996 | (WO) | | G07F/13/02 |

OTHER PUBLICATIONS

Womack, Phil "Regulations changing fuel management options", Gale Group: Jan. 28, 1992.*

"Sony and Coca Cola in Cross–Promo Link–up", Gale Group: Mar. 16, 1991.*

* cited by examiner

Primary Examiner—Eric W. Stamber
Assistant Examiner—Jean D Janvier
(74) Attorney, Agent, or Firm—Smith, Danamraj & Youst, P.C.

(57) ABSTRACT

A method of providing multiple level, price-per-unit (PPU) discounts on gasoline to a customer who purchases at least one cross-marketed product. The customer is awarded a first PPU discount on the gasoline based on a purchase by the customer of a first cross-marketed product, and is awarded a second PPU discount based on the purchase of a second cross-marketed product. The first discount is then added to the second discount to determine a total PPU discount, and a paper receipt is printed for the customer with a customer identification and a transaction identification encoded in a bar code thereon. The total discount is stored in a discounts issued database. The customer then scans the encoded bar code with a bar code scanner at a gasoline dispenser to redeem the discount. The total discount is retrieved from the discounts issued database, and the gasoline station then reduces the price-per-unit-volume of the gasoline by an amount equal to the total discount. When the customer completes the gasoline purchase, a value of the total discount redeemed is determined and stored in a discounts redeemed database. Portions of the discount redeemed are then allocated to vendors of the first and second cross-marketed products according to predetermined criteria.

27 Claims, 6 Drawing Sheets

| FIELD # | FIELD | DESCRIPTION | TYPE | MIN | MAX | EXAMPLE |
|---|---|---|---|---|---|---|
| 1 | DISCOUNTREFNO | MATCHES CUSTOMER'S RECEIPT WITH THIS RECORD | NUMERIC | 20 | 20 | 12345612345600000001 |
| 1a | DISCOUNTCHAIN | CHAIN IDENTIFIER | NUMERIC | 6 | 6 | 123456 |
| 1b | DISCOUNTSTORE | STORE IDENTIFIER | NUMERIC | 6 | 6 | 123456 |
| 1c | DISCOUNTID | SITE-UNQUE DISCOUNT IDENTIFIER | NUMERIC | 8 | 8 | 00000001 |
| 2 | SALEDATE | LOCAL DATE OF POS SALE | DATE | 8 | 8 | 19990125 |
| 3 | SALETIME | LOCAL TIME OF POS SALE | TIME | 8 | 8 | 090000 |
| 4 | SALEPOSID | SITE-RELATIVE IDENTIFIER OF POS THAT ISSUED DISCOUNT | ALPA-NUMERIC | 0 | 6 | L45 |
| 5 | UNITDISCOUNT | DISCOUNT IN CENTS PER FUEL UNIT VOLUME | NUMERIC (FLOAT) | 4 | 5 | 0.15 |
| 6 | DISCOUNTMAXUNTIS | MAXIMUM FUEL UNITS AUTHORIZED FOR SALE AT DISCOUNT PRICE | NUMERIC | 1 | 4 | 12 |
| 7 | TOTALDISCOUNT | DISCOUNT EXPRESSED AS AMOUNT TO BE DEDUCTED FROM TOTAL SALE | NUMERIC (FLOAT) | 3 | 5 | 2.75 |
| 8 | DISCOUNTMINUNITS | MINIMUM FUEL UNITS THAT MUST BE PURCHASED TO QUALIFY FOR DISCOUNT | NUMERIC | 1 | 3 | 5 |
| 9 | DISCOUNTEXPIRES | LOCAL DATE OF LAST DAY THAT DISCOUNT IS VALID | DATE | 8 | 8 | 19990210 |
| 10 | COUPONIDS | LIST OF COUPON IDS THAT MADE UP THIS DISCOUNT | NUMERIC (WITH SUB-FIELDS) | 0 EACH 0 TOTAL | 5 EACH 179 TOTAL | 23-171-999-19713-2123 |
| 11 | COUPONCOUNT | NO. OF COUPONS THAT MADE UP THIS DISCOUNT | NUMERIC | 1 | 2 | 5 |
| 12 | LOYALTYCARDID | LOYALTY CARD IDENTIFIER | NUMERIC | 1 | 16 | 3456 |

*FIG. 2*

SYSTEM AND METHOD OF PROVIDING MULTIPLE LEVEL DISCOUNTS ON CROSS-MARKETED PRODUCTS AND DISCOUNTING A PRICE-PER-UNIT-VOLUME OF GASOLINE

This appln. claims benefit of Prov. No. 60/093,813 filed Jul. 23, 1998.

BACKGROUND OF THE INVENTION

1. Technical Field of the Invention

This invention relates to the generation and redemption of discount coupons for multiple vendors and, more particularly, to a system and method of controlling tile generation, distribution, and redemption of coupons, and the allocation of discounted values to multiple vendors involved in cross-marketing ventures.

2. Description of Related Art

Vendors of various products often find it desirable to enter into cross-marketing agreements in which the purchase of a product from a first vendor earns a discount coupon for the consumer on a product from a second vendor. As used herein, the term "vendor" refers to the manufacturer of a specific product or the supplier of specific services. The term "high volume retailer (HVR)" refers to the store where the products or services are purchased, such as grocery stores, discount stores, warehouse stores, supercenters, etc.

Systems and methods exist which track the redemption of such cross-marketing coupons and control the allocation of discounted values between the vendors. These systems and methods, however, do not enable vendors to associate issued coupons directly with specific customers or transactions. Nor do existing systems and methods generate coupons or rewards applicable to discounts on the price per unit of a cross-marketed product such as gasoline which is sold by the gallon or liter. In addition, existing systems and methods are not flexible and do not enable a vendor to offer variable discounts which increase if a customer purchases a plurality of cross-marketed products or purchases products from a plurality of cross-marketing vendors. The discount amount is fixed for each purchase.

This is a disadvantage if vendors attempt to use existing systems and methods to cross-market a consumable such as gasoline which is sold at a particular price per gallon. Since the total amount of a gasoline purchase generally cannot be determined in advance, a discount for a particular amount may not be appropriate. For example, a $5.00 discount is not appropriate if the consumer fills up an automobile with gasoline, and the total charge is only $4.00. In addition, studies have shown that it is more attractive to consumers of gasoline to receive a discount on the price per gallon than it is to receive a fixed discount on the total purchase. Current control systems and methods cannot handle a discount on the price per gallon since the total discount is not known before the purchase is completed.

An additional problem with existing systems and methods for tracking and allocating discount coupons is that they do not allow for cumulative savings based on the purchase of multiple cross-marketed products. It would be desirable to gasoline vendors to have a method which would allow the application of varying discounts to the price per gallon based on the number of cross-marketed products purchased. For example, if the gasoline vendor had a cross-marketing agreement with various vendors of products sold by a HVR merchant, the purchase of Product A could result in a discount in the price of the gasoline of $0.02 per gallon. Likewise, the purchase of Product B could result in a discount in the price of the gasoline of $0.02 per gallon. If the consumer buys both products, it would be desirable to discount the price of the gasoline by $0.04 per gallon. Existing systems and methods do not perform this function.

Although there are no known prior art teachings of a solution to the aforementioned deficiency and shortcoming such as that disclosed herein, several references discuss subject matter that bears some relation to matters discussed herein. U.S. Pat. No. 5,173,851 to Off et al. (Off) discloses a system for creating discount coupons in response to the purchases of products. Off includes a process in which a coupon is issued in response to the purchase of multiple triggering items. However, the coupon is for a predetermined amount, and is not variable. Multiple items must be purchased in order to qualify for the fixed discount.

U.S. Pat. No. 4,949,256 to Humble (Humble) discloses a coupon validation network for automatically processing product coupons. Databases are maintained for coupons issued by manufacturers and for coupons redeemedby retailers. The system enables retailers to automatically process coupons presented for redemption by consumers, and enables manufacturers to conveniently reimburse retainers for the value of the redeemed coupons. However, Humble does not teach or suggest a system or method of handling multiple level discounts or discounts on the basis of a price per gallon.

Review of each of the foregoing references reveals no disclosure or suggestion of a method such as that described and claimed herein. In order to overcome the disadvantage of existing solutions, it would be advantageous to have a method which enables vendors to associate issued coupons directly with specific customers or transactions, and which allows the application of multiple level discounts to the price per gallon of gasoline based on the number of cross-marketed products purchased. The present invention provides such a method.

SUMMARY OF THE INVENTION

In one aspect, the present invention is a method of providing multiple level discounts on a first product to a customer who purchases at least one cross-marketed product. The method comprises the steps of awarding a first discount on the first product to the customer based on a purchase by the customer of a first cross-marketed product, awarding a second discount on the first product to the customer based on a purchase by the customer of a second cross-marketed product, adding the first discount to the second discount to determine a total discount on the first product, and awarding the total discount to the customer.

In another aspect, the present invention is a method of providing a discount on a first product to a customer who purchases at least one cross-marketed product. The method begins by awarding a first discount on the first product to the customer based on a purchase by the customer of a first cross-marketed product, and then issuing a coupon to the customer which provides a customer identification and a transaction identification. A discount amount is stored in a discounts issued database which associates the discount amount with the customer identification and the transaction identification. This is followed by inputting, by the customer in a subsequent transaction, the customer identification and the transaction identification, retrieving the discount amount from the discounts issued database, and reducing the price of the first product by the discount amount.

In yet another aspect, the present invention is a method of providing multiple level discounts on gasoline to a customer who purchases at least one cross-marketed product. The method includes the steps of awarding to the customer, a first discount on the price-per-unit-volume of the gasoline based on a purchase by the customer of a first cross-marketed product, and awarding a second discount on the price-per-unit-volume of the gasoline based on the purchase of a second cross-marketed product. The first discount is then added to the second discount to determine a total discount on the price-per-unit-volume of the gasoline. A paper receipt is printed for the customer with a customer identification and a transaction identification encoded in a bar code thereon. The total discount, a maximum number of volume units allowed, and a minimum purchase of gasoline required in order to qualify for the discount are stored in a discounts issued database which associates these data with the customer identification and the transaction identification. The customer then scans the encoded bar code with a bar code scanner at a gasoline dispenser. The total discount is retrieved from the discounts issued database, and the gasoline station then reduces the price-per-unit-volume of the gasoline by an amount equal to the total discount. When the customer completes the gasoline purchase, a value of the total discount redeemed is determined. This is followed by verifying that the value of the total discount redeemed is equal to or less than the maximum discount allowed, and verifying that the amount of gasoline purchased is equal to or greater than the minimum purchase required to qualify for the discount. The value of the discount redeemed is then stored in a discounts redeemed database, and portions of the discount redeemed are allocated to vendors of the first and second cross-marketed products according to predetermined criteria.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 2 is a table illustrating an exemplary record format for a Discounts Issued message which informs a system controller of the discounts issued by a grocery store POS terminal;

DETAILED DESCRIPTION OF EMBODIMENTS

Figure 1:
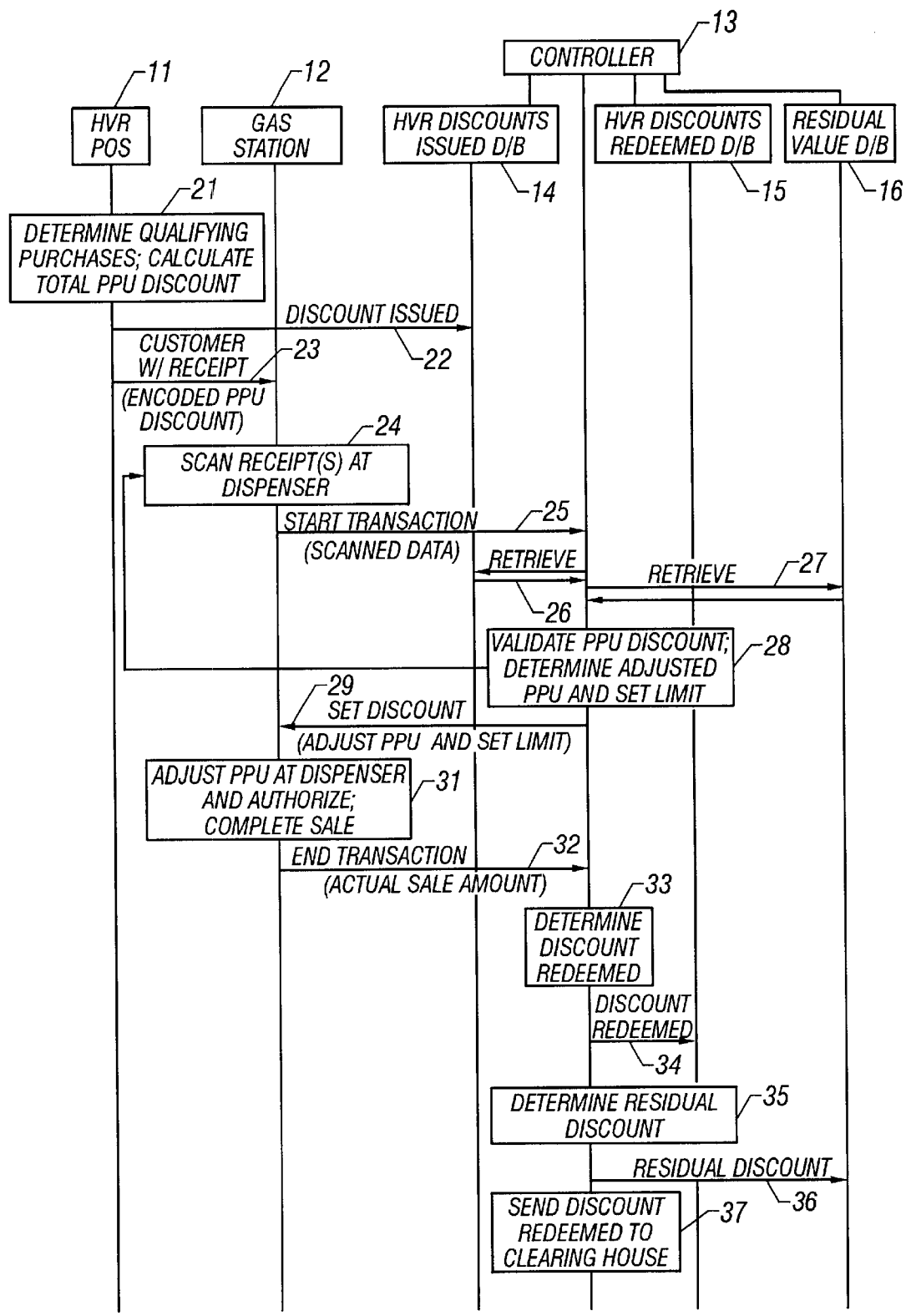
FIG. 1 is a message flow diagram illustrating the messages sent between the components of the system of the present invention during a cross-merchandising transaction.

The present invention is a method of utilizing electronic coupons for cross-marketing. By making a purchase of one or more products, a customer earns discount credits toward the purchase of another product such as gasoline. For example, if the customer buys Product A from a HVR merchant such as a grocery store or convenience store, she may earn a Price Per Unit (PPU) discount of $0.02/gallon on her next purchase of gasoline at a participating gas station. Her receipt from the grocery store may be imprinted with an encoded bar code which is read by a bar-code reader at the gasoline dispenser. The price of the gasoline is then adjusted to provide her with her discount. The receipt is treated as a legal tender coupon. Therefore, if the discount earned is greater than the PPU price of the gasoline, the customer may get a credit back at the end of the transaction for the unused portion of the discount. Alternatively, the coupon can be printed to inform the customer that it is good only up to the PPU price of the gasoline.

The PPU price on the gasoline dispenser can be discounted to multiple levels, depending on the discount which the customer has earned. For example, if the customer also bought Product B which provides a gasoline discount of $0.02/gallon, in addition to Product A, then the system automatically adds the two discounts together to calculate a total discount. Thus, when the customer scans in her receipt and purchases gasoline, she receives a PPU discount of $0.04/gallon.

The system also tracks discounts that are not product-specific. For example, a HVR merchant such as a grocery store may offer a gasoline discount if a customer purchases a threshold amount of groceries over a designated period of time. For example, a purchase of $100 in a single trip may earn a discount of $0.10/gallon, while a purchase of $200 may earn a discount of $0.20/gallon. Alternatively, cumulative purchases over the time period may reach a threshold level and qualify for a discount. For example, purchases totaling $300 in a week may qualify for a $0.10/gallon discount. Additionally, since some products in the store provide a higher margin to the retailer, the grocery store may target the purchases to a specific department such as bakery goods. For example, a $15 bakery purchase may entitle the customer to a $0.04/gallon discount. Other products such as produce need to be sold fairly rapidly to avoid spoilage. These products may also be targeted to provide gasoline discounts.

The customer may also scan in several receipts at the gasoline dispenser and be awarded a cumulative discount. The receipts may be from several visits to a single HVR merchant, or may be from multiple independent HVR merchants. As discussed below, the receipt is encoded to provide the system with the proper information regarding the identity of the customer, the receipt, and the HVR merchant.

Some grocery stores offer frequent shopper cards to their customers which provide discounts on selected products if the card is scanned at the register at the time of purchase. The present invention enables the customer to utilize credits earned on her frequent shopper card to obtain PPU discounts on gasoline. The card may be electronically updated with credits earned at the conclusion of a shopping trip to the grocery store. The credits earned are also printed on the customer's receipt so that she has a record of the discount earned. The credits are then recognized when the customer scans the card at the gasoline station. The credit is then applied to the gasoline purchase. If the entire credit is not utilized, the remaining credit is updated on the card.

The present invention is not limited to any one method of providing the system with data regarding the identity of the customer, the receipt, and the issuing HVR merchant. Thus, for example, the discount may be encoded in a bar code on a printed receipt, it may be transferred by a radio frequency identification (RFID) device, or it may be magnetically encoded on a frequent shopper card or other magnetic medium such as a prepaid card or credit card. The customer may also be given a code number which may be entered at the gasoline dispenser in order to trigger the discount in the price per gallon. A personal identification number (PIN) may be utilized to trigger the discount or to provide security for any form of other electronic coupon.

The gasoline business is highly cost competitive, and customers generally purchase their gasoline at the station where they perceive they are getting the best price per gallon. It is difficult, however, for a gasoline retailer to maintain a competitive price advantage because as soon as he lowers his posted street price, his competitors lower their prices to match. The present invention offers a method by which a gasoline retailer can maintain a posted street price (seen by his competitors) while offering his customers the benefit of individualized prices which are discounted from the posted street price. The method also enables gasoline retailers who operate convenience stores in conjunction with their gasoline sales to increase inside sales by offering discounts on gasoline in response to the purchase of goods inside the store.

FIG. 1 is a message flow diagram illustrating the messages sent between the components of the system of the present invention during a cross-merchandising transaction. The system includes a HVR point of sale (POS) terminal 11, a gas station 12, and a controller 13 which is associated with a HVR discounts issued database 14, a HVR discounts redeemed database 15, and a residual value database 16.

When a customer purchases items from the HVR merchant, the HVR POS terminal 11 determines at 21 which purchases qualify for a price-per-unit (PPU) discount on gasoline. A total PPU discount is then calculated by adding each individual PPU discount for which the customer has qualified. Transaction data including an identification of the customer and the total discount issued is sent to the HVR discounts issued database 14 in a Discounts Issued message 22. The customer identification may be utilized to track customer loyalty or, in the case of HVR merchants that require memberships, the customer identification may be utilized to verify membership. At 23, the HVR POS terminal prints a receipt for the customer which includes an encoded customer identification and transaction identification associated with the discount, and the customer takes the receipt to the gas station 12.

Referring briefly to FIG. 2, an exemplary record format is shown for the Discounts Issued message 22 which carries customer, transaction, and store identifications to the HVR discounts issued database 14. Field 1 serves as the key for matching the customer's receipt with a particular discount record. This number may be encoded, for example, in a bar code on the POS sale receipt. Field 1 may be divided into sub-fields 1a–1c. Sub-field 1a identifies the chain to which the HVR store belongs. This number is unique across the discount program, and enables a customer to redeem a discount earned at a particular store in a chain at any other store in the chain. Sub-field 1b identifies the particular store within the HVR chain. This number must be unique within a chain or store ownership group. Sub-field 1c is a site-unique discount identifier which may be utilized in combination with sub-fields 1a and 1b to identify a particular customer or transaction. Sub-field 1c must be unique within a site (chain+store) discount expiration period. Fields 2 and 3 report the date and time of the sale.

Field 4 identifies a particular POS terminal within the identified site for store auditing purposes. Field 5 shows the PPU discount issued in cents per fuel-unit volume (for example, 0.15/gallon). Field 6 shows the maximum fuel units that are authorized for sale at the discounted price, and Field 8 shows the minimum fuel units that must be purchased in order to qualify for the discount. The POS terminal may issue a total discount instead of a PPU discount and, if so, this information is supplied in Field 7. When Field 7 (total discount) is supplied, Field 8 (minimum units) may also be supplied, but Field 5 (unit discount) must not be supplied. Conversely, when Field 5 (unit discount) is supplied, Field 6 may be supplied, but Field 7 (total discount) and Field 8 (minimum units) are ignored.

Field 9 provides the local date of the last day that the discount is valid. Field 10 provides a list of logical coupon identifications which made up the discount, and Field 11 provides a count of the number of logical coupons that made up the discount. The coupon IDs may be passed to the HVR discounts redeemed database 15 and to a clearing house (not shown) in a Discounts Redeemed record so that the discount can be allocated to the proper vendors according to predetermined criteria. The discount may be allocated according to negotiated agreements or on a pro rata basis. Field 12 provides a loyalty card identifier for individual customers of stores that use loyalty cards such as frequent shopper cards.

Referring again to FIG. 1, when the customer desires to redeem the discount, the receipt is scanned at 24 by a bar code scanner at the pump dispenser at the gasoline station 12. This causes the dispenser to send a start transaction message 25 to the controller 13. The start transaction message includes the data scanned from the customer's receipt. At 26, the controller retrieves information regarding the issued discount from the HVR discounts issued database 14. At 27, the controller also retrieves information regarding any residual discount that may have been stored in the residual value database 16 from a previous transaction. At 28, the controller validates the scanned data by comparing it with data retrieved from the HVR discounts issued database 14 and the residual value database 16. If the scanned data is valid, the controller adds any residual discount to the discount issued to obtain a total PPU discount. The controller then determines an adjusted PPU price by subtracting the total PPU discount from the normal price. The controller also sets an upper limit on the number of gallons subject to the discount. If the customer scans more than one receipt, the process from steps 24 to 28 is repeated, and the discount associated with each receipt is added to the total PPU discount, and is subtracted from the normal price.

The controller then sends a set discount message 29 to the dispenser and includes instructions to adjust the displayed price per gallon by the amount of the total PPU discount, and to set the maximum limit on the number of gallons that can be purchased at the discounted price. Alternatively, a maximum discount value can be set. If the calculated total PPU discount is greater than the PPU displayed on the gasoline dispenser, the controller sets the displayed PPU price to zero (0). On dispensers that will not display a PPU price of zero, the lowest price which the dispenser will display is shown to the customer. After the sale is complete, and the sale amount is reported to the controller at step 32, the controller sets the sale amount to zero.

At 31, the gasoline station dispenser adjusts the price per gallon on the dispenser, and the dispenser is authorized. When the sale is completed, the dispenser sends an end transaction message 32 to the controller and includes the actual sale amount. The actual value of the discount redeemed is then determined at 33. At 34, the discount redeemed amount is then sent to the HVR discounts redeemed database 15. The HVR merchant can compare data from the HVR discounts issued database 14 and the HVR discounts redeemed database 15 to determine the effectiveness of cross-marketing agreements on various products. The controller determines if there is any residual discount at 35, and if so, sends the residual discount at 36 to the residual value database 16. At 37, the controller sends the discount redeemed to a clearing house (not shown) for allocation to the proper vendors.

Figure 3A:
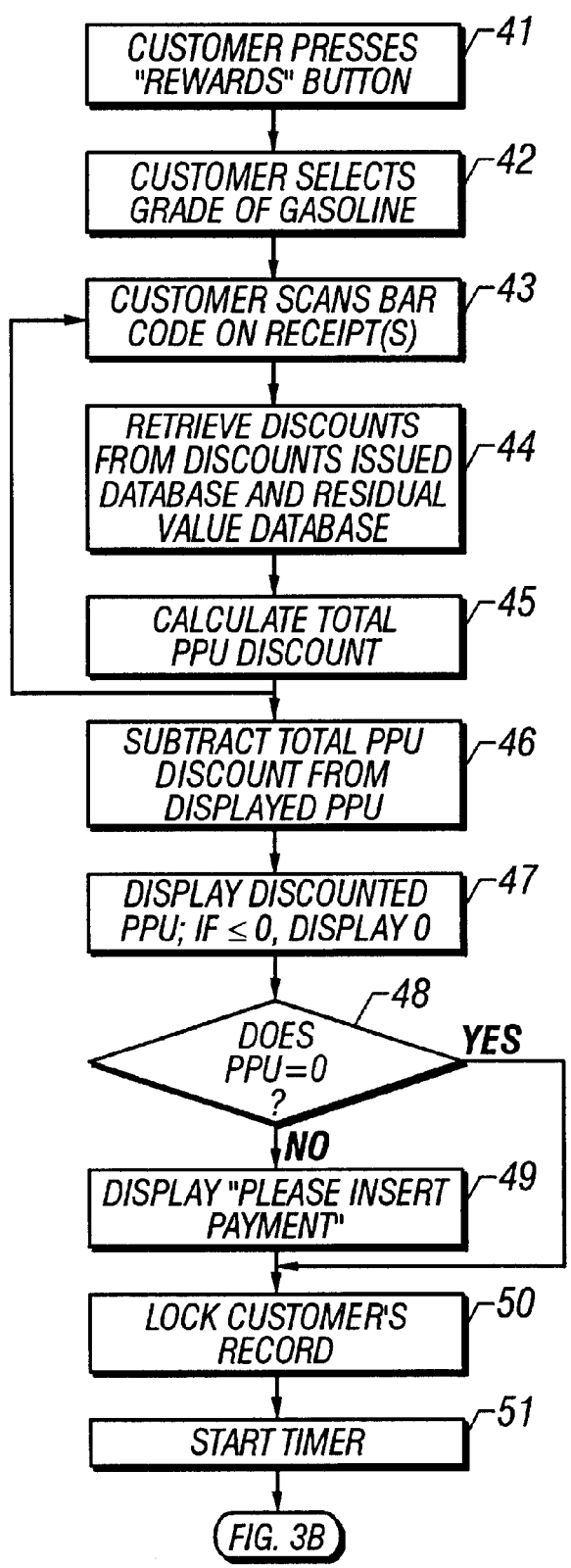
FIGS. 3A–3C are a flow chart illustrating the steps of the method when a customer redeems an issued discount at a gasoline station.
Figure 3B:
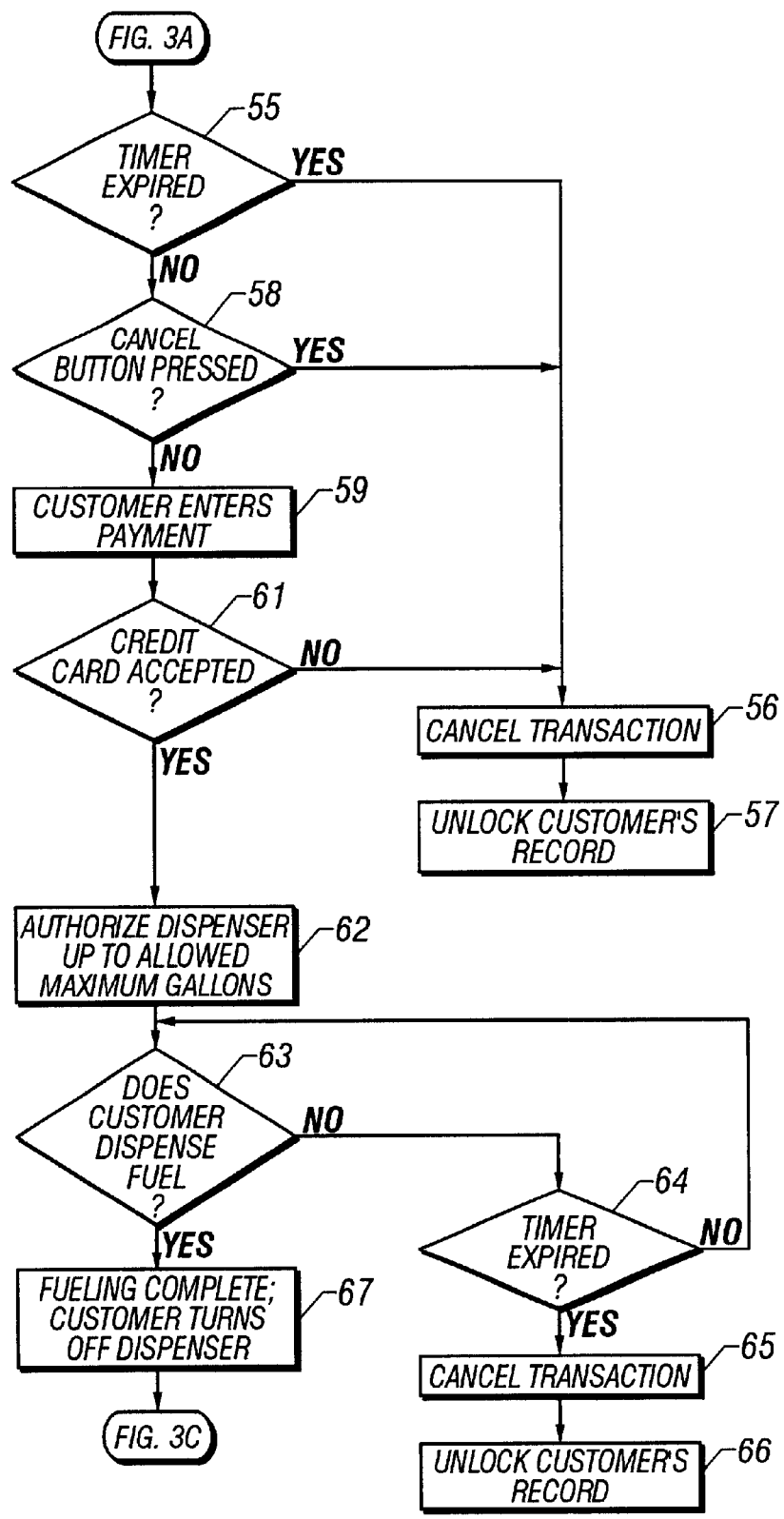
Figure 3C:
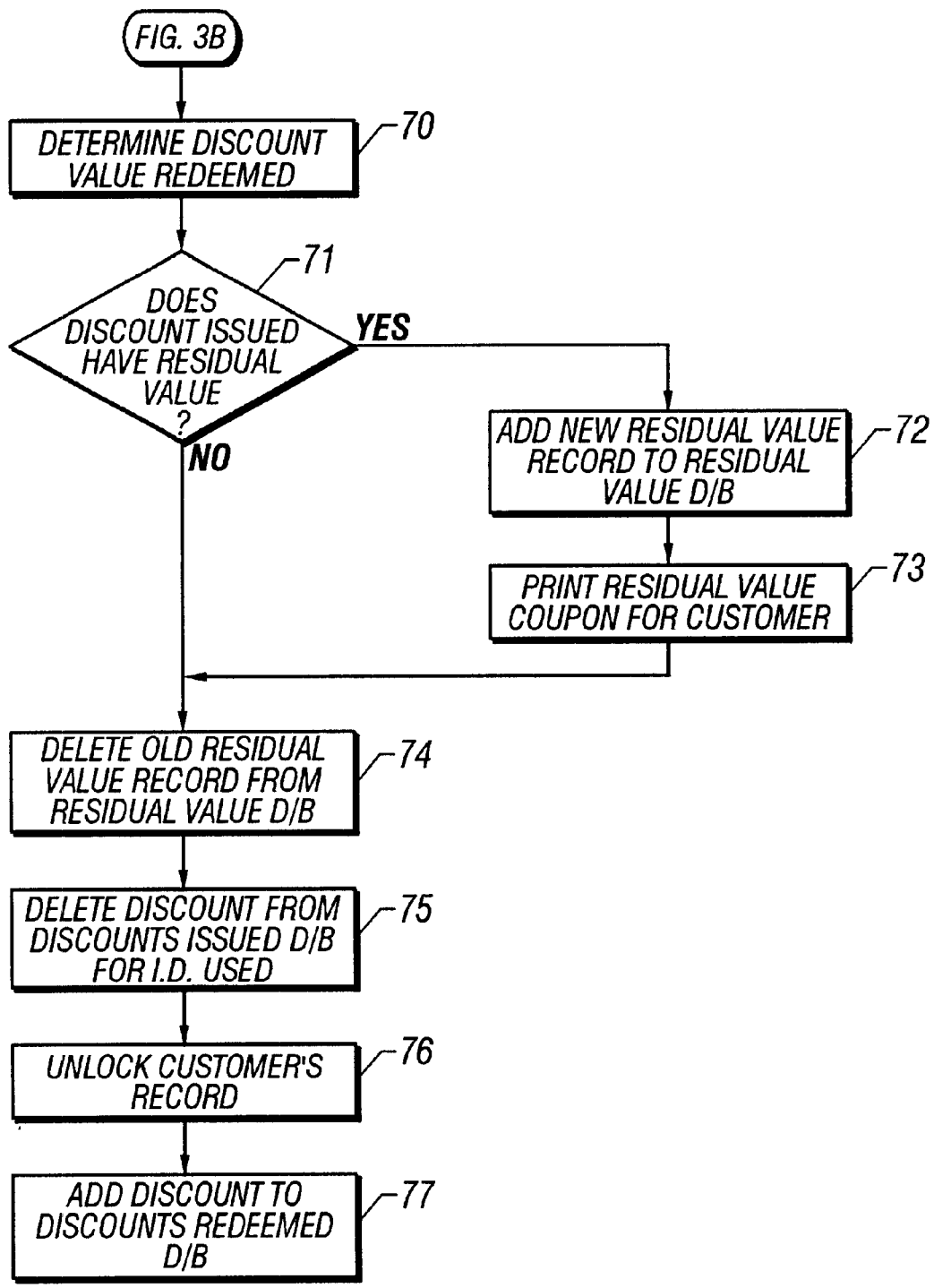

FIGS. 3A–3C are a flow chart illustrating the steps of the method when a customer redeems an issued discount at a gasoline station. Referring concurrently to FIG. 1 and FIG. 3A, it can be seen at step 41 that the process may be started by having the customer press a "Rewards" button at the gasoline dispenser, and then selecting a grade of gasoline to be purchased at step 42. Alternatively, the process may be started automatically when the customer selects a grade of gasoline and then at 43, scans the bar code on the receipt that was printed at the HVR POS terminal. At 44, the gas station then sends the information scanned from the bar code, which includes the discount reference number, a customer identification, and a transaction identification to the controller 13 which retrieves information relating to the issued discount from the discounts issued database 14. The controller also retrieves information regarding any residual discount that may have been stored from a previous transaction in the residual value database 16. The controller then calculates a total PPU discount at step 45 by adding the issued discount to the residual discount, if any. If the customer scans additional receipts, the process repeats steps 42–45 and calculates a total PPU discount that combines the discounts for all scanned receipts.

At 46, it is determined whether or not the calculated total PPU discount is greater than the PPU displayed on the gasoline dispenser. If not, the method moves to step 47 and subtracts the total PPU discount from the displayed PPU and then displays a new discounted PPU on the dispenser at 48. However, if the calculated new discounted PPU is less than or equal to zero, the discounted PPU is then set to zero (0) at 47 and is displayed on the dispenser. If the PPU is not zero at 48, the method moves to step 49 where the display instructs the customer to enter payment, which may be a credit card or dollar bills. If the PPU is zero, the method moves directly to step 50 where the customer's record is locked, and a timer is started at 51. The method then moves to FIG. 3B, step 55.

If the timer expires at step 55 before any further action is taken, the method moves to step 56 where the timer automatically ends the transaction. Thus, if the customer finds, for example, that he has no money, or is unable to complete the transaction for any other reason, the next person in line does not get the customer's discount. The customer's record is unlocked at 57, and the value of the customer's discount is retained.

If the customer presses a "Cancel Transaction" button at 58 before the timer expires at 55, the method also moves to step 56 where the transaction is canceled and the customer's record is unlocked at 57, and the value of the customer's discount is retained. If the Cancel Transaction button is not pressed, the method moves to step 59 where the customer enters his payment. At step 61, it is determined whether or not the customer's credit card is accepted. If not, the method moves to step 56 where the transaction is canceled and the customer's record is unlocked at 57, and the value of the customer's discount is retained. If the credit card is accepted, the method moves to step 62 where the dispenser is authorized to dispense up to the maximum number of gallons authorized in Field 6 of the Discount Issued message 22 (FIG. 2). The dispenser is automatically shut off if the maximum number of gallons is reached.

It is then determined at step 63 whether or not the customer has dispensed fuel. If not, it is determined at 64 whether or not the timer has expired. If the timer has not expired, the method returns to step 63 and waits for the customer to begin dispensing the fuel. If the customer does not begin dispensing fuel before the timer expires, the method moves to step 65 where the transaction is canceled and the customer's record is unlocked at 66, and the value of the customer's discount is retained. If the customer dispenses fuel at 63, the method moves to step 67 where the customer completes fueling and turns off the dispenser. The method then moves to FIG. 3C, step 70.

At step 70, the value of the discount redeemed is determined by multiplying the PPU discount by the number of gallons purchased. The process then moves to step 71 where it is determined whether there is any residual value to the issued discount. If so, the method moves to step 72 where the residual value is added to the residual value database 16 in a new residual value record. For the customer's convenience, the gasoline dispenser may then print a residual value coupon for the customer at 73 which can be utilized to redeem the residual value in a future transaction. Following this, or if the issued discount did not have any residual value, the method moves to step 74 where the old residual value record is deleted from the residual value database. At step 75, the discount is then deleted from the discounts issued database 14 for the discount reference number utilized. The customer's record is then unlocked at 76. At 77, the discount is then added to the discounts redeemed database 15.

Figure 4:
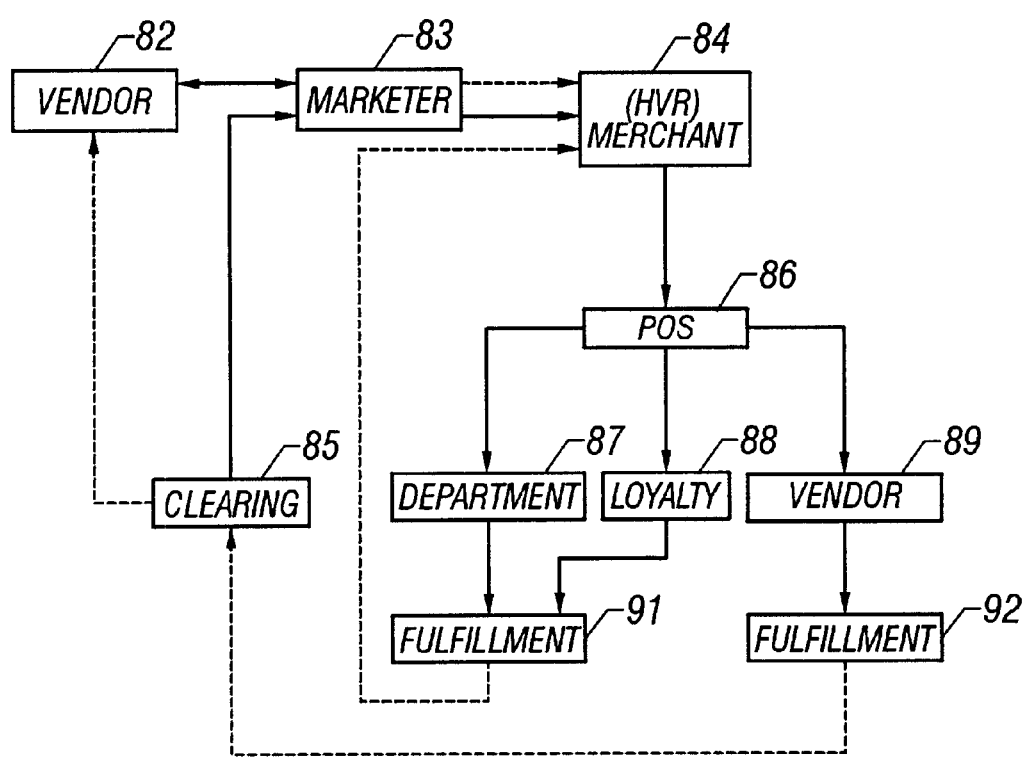
FIG. 4 is a flow chart illustrating an overall method of issuing, redeeming, and clearing discount coupons in which the method of the present invention may be practiced.

FIG. 4 is a flow chart illustrating an overall method of issuing, redeeming, and clearing discount coupons in which the method of the present invention may be practiced. A vendor 82, a marketer 83, a HVR merchant 84, and a clearing house 85 are involved in the method. Dotted lines in the flow chart represent the passing of settlement information. The HVR merchant may be, for example, a grocery store or convenience store which also sells gasoline to its customers. The HVR merchant utilizes a POS terminal 86 through which sales transactions are processed. The transactions may be categorized as department transactions 87, loyalty transactions 88, or vendor transactions 89. A department transaction 87 may be sales in a particular department such as the bakery department in which the HVR merchant has decided to offer awards for bakery purchases. By purchasing a minimum amount of bakery goods, the customer is issued a discount coupon which is good for a reduction in the PPU price of gasoline at the store. Therefore, fulfillment at 91 and settlement are accomplished within the HVR merchant's own accounting system.

A loyalty transaction 88 may be a transaction in which the customer utilizes a store credit card or frequent shopper card. Fulfillment at 91 and settlement of the gasoline discount for this transaction are also accomplished within the HVR merchant's own accounting system. However, transactions involving the purchase of a participating vendor's products at 89 require fulfillment at 92 and settlement through the clearing house 85 and the marketer 83.

It is thus believed that the operation and construction of the present invention will be apparent from the foregoing description. While the method shown and described has been characterized as being preferred, it will be readily apparent that various changes and modifications could be made therein without departing from the scope of the invention as defined in the following claims.

What is claimed is:

1. A method of providing multiple level discounts on a price-per-unit (PPU) of a consumable good sold in multiple units to a customer who purchases a plurality of cross-marketed products, said method comprising the steps of:
   awarding a first discount on the PPU of the consumable good to the customer in response to a purchase by the customer of a first cross-marketed product;
   awarding a second discount on the PPU of the consumable good to the customer in response to a purchase by the customer of a second cross-marketed product;

adding the first discount to the second discount to determine a total discount on the PPU of the consumable good; and awarding the total discount to the customer.

2. The method of providing multiple level discounts of claim 1 wherein the customer purchases the first cross-marketed product from a first merchant, and purchases the second cross-marketed product from a second merchant.

3. The method of providing multiple level discounts of claim 1 wherein the consumable good is gasoline, and the first, second, and total discounts are discounts on the price-per-unit-volume of gasoline.

4. The method of providing multiple level discounts of claim 3 further comprising:

issuing an electronic coupon to the customer, said coupon providing a unique customer identification and a unique discount identification; and storing the total discount in a discounts issued database which associates the total discount with the unique customer identification and discount identification.

5. The method of providing multiple level discounts of claim 4 wherein the electronic coupon is selected from the group consisting of:

a paper receipt with the unique customer identification and discount identification encoded in a bar code imprinted thereon;

a paper receipt with the unique customer identification and discount identification encoded in a code number imprinted thereon;

a frequent shopper card with the unique customer identification and discount identification magnetically encoded thereon;

a prepaid card with the unique customer identification and discount identification magnetically encoded thereon;

a credit card with the unique customer identification and discount identification magnetically encoded thereon;

a radio frequency identification (RFID) device with the unique customer identification and discount identification encoded in a RF transmission; and a smart card.

6. The method of providing multiple level discounts of claim 5 further comprising the steps of:

inputting the electronic coupon by the customer for redemption at a gasoline station; and reducing on a gasoline dispenser, the price-per-unit-volume of the gasoline by an amount equal to the total discount prior to the customer dispensing the gasoline.

7. The method of providing multiple level discounts of claim 6 wherein the step of inputting the electronic coupon by the customer for redemption at a gasoline station includes scanning the unique customer identification and discount identification from the encoded bar code with a bar code scanner at a gasoline dispenser, and the method further comprises, after scanning the encoded bar code, the steps of:

associating the unique customer identification and discount identification with the total price-per-unit discount stored in the discounts issued database; and retrieving the total price-per-unit discount from the discounts issued database.

8. The method of providing multiple level discounts of claim 7 further comprising, after the step of scanning the unique customer identification and discount identification from the encoded bar code, the steps of:

requesting the customer to enter a personal identification number (PIN); and verifying the PIN prior to reducing the price-per-unit-volume of the gasoline on the gasoline dispenser.

9. The method of providing multiple level discounts of claim 7 further comprising, after the step of storing the total discount in a discounts issued database, the steps of:

storing, in the discounts issued database, a maximum number of gallons of gasoline to which the discount applies; and storing, in the discounts issued database, a minimum purchase of gasoline required in order to qualify for the discount.

10. The method of providing multiple level discounts of claim 9 further comprising the steps of:

determining a value of the total discount redeemed;

verifying that the value of the total discount redeemed is less than or equal to the maximum discount allowed; and verifying that the amount of gasoline purchased is greater than or equal to the minimum purchase required to qualify for the discount.

11. The method of providing multiple level discounts of claim 10 further comprising the steps of:

storing the value of the discount redeemed in a discounts redeemed database; and allocating portions of the discount redeemed to vendors of the first and second cross-marketed products according to predetermined criteria.

12. A method of providing a discount on a price-per-unit (PPU) of a consumable good sold in multiple units to a customer who purchases at least one cross-marketed product, said method comprising the steps of:

awarding a first discount on the PPU of the consumable good to the customer in response to a purchase by the customer of a first cross-marketed product;

issuing a coupon to the customer, said coupon providing a customer identification and a transaction identification;

storing the first discount in a discounts issued database which associates the first discount with the customer identification and the transaction identification;

inputting by the customer in a subsequent transaction, the customer identification and the transaction identification;

retrieving the first discount from the discounts issued database; and reducing the PPU of the consumable good by the first discount.

13. The method of providing a discount on a PPU of a consumable good of claim 12 further comprising, after the step of awarding a first discount, the steps of:

awarding a second discount on the PPU of the consumable good to the customer in response to a purchase by the customer of a second cross-marketed product; and adding the first discount to the second discount to determine a total discount on the PPU of the consumable good.

14. The method of providing a discount on a PPU of a consumable good of claim 12 wherein the first product is gasoline, and the discount amount is a discount on the price-per-unit-volume of gasoline.

15. A method of providing multiple level discounts on gasoline to a customer who purchases at least one cross-marketed product, said method comprising the steps of:

awarding to the customer, a first discount on the price-per-unit-volume of the gasoline in response to a purchase by the customer of a first cross-marketed product;

awarding to the customer, a second discount on the price-per-unit-volume of the gasoline in response to a purchase by the customer of a second cross-marketed product;

adding the first discount to the second discount to determine a total discount on the price-per-unit-volume of the gasoline;

printing a paper receipt for the customer with a customer identification and a discount identification encoded in a bar code thereon;

storing the total discount in a discounts issued database;

storing, in the discounts issued database, a maximum number of gallons to which the discount applies;

storing, in the discounts issued database, a minimum purchase of gasoline required in order to qualify for the discount;

scanning the encoded bar code with a bar code scanner at a gasoline dispenser;

verifying the discount scanned from the bar code by comparing the scanned discount with the stored discount in the discounts issued database;

reducing, by the gasoline dispenser, the price-per-unit-volume of the gasoline by an amount equal to the total discount;

determining a value of the total discount redeemed;

verifying that the value of the total discount redeemed is less than or equal to the maximum discount allowed;

verifying that the amount of gasoline purchased is greater than or equal to the minimum purchase required to qualify for the discount;

storing the value of the discount redeemed in a discounts redeemed database; and allocating portions of the discount redeemed to vendors of the first and second cross-marketed products according to predetermined criteria.

16. A method of providing a price-per-unit-volume discount on gasoline to a customer who purchases a cross-marketed product in a sales transaction, said method comprising the steps of:

awarding the price-per-unit-volume discount to the customer in response to a purchase by the customer of a cross-marketed product;

issuing an electronic coupon to the customer, said coupon identifying the customer and the sales transaction;

storing the price-per-unit-volume discount in a discounts issued database which associates the discount with the customer and sales transaction;

storing, in the discounts issued database, a maximum number of volume units of gasoline to which the discount is applied;

storing, in the discounts issued database, a minimum purchase of gasoline required in order to qualify for the discount;

beginning a sales transaction by entering a customer identification and a transaction identification at a gasoline dispenser;

retrieving the price-per-unit-volume discount from the discounts issued database;

reducing, by the gasoline dispenser, the price-per-unit-volume of the gasoline by an amount equal to the discount;

determining a value of the total discount redeemed;

verifying that the value of the total discount redeemed is less than or equal to the maximum discount allowed;

verifying that the amount of gasoline purchased is greater than or equal to the minimum purchase required to qualify for the discount; and storing the value of the discount redeemed in a discounts redeemed database.

17. The method of providing a price-per-unit-volume discount on gasoline of claim 16 wherein a residual discount is stored in a residual value database, and the method further comprises, after retrieving the price-per-unit-volume discount from the discounts issued database, the steps of:

retrieving the residual discount from the residual value database; and adding the residual discount to the price-per-unit-volume discount.

18. The method of providing a price-per-unit-volume discount on gasoline of claim 17 wherein the step of reducing the price-per-unit-volume of the gasoline by an amount equal to the discount includes the steps of:

determining whether the discount is greater than or equal to the price-per-unit volume of the gasoline; and setting the price-per-unit volume of the gasoline equal to zero on a gasoline dispenser upon determining that the discount is greater than or equal to the price-per-unit volume of the gasoline.

19. The method of providing a price-per-unit-volume discount on gasoline of claim 18 wherein the step of setting the price-per-unit volume of the gasoline equal to zero includes the steps of:

determining whether the dispenser is of a type that can set the price-per-unit volume to zero;

setting the dispenser to the minimum price-per-unit volume that the dispenser allows, upon determining that the dispenser is of a type that cannot set the price-per-unit volume to zero; and setting a sales transaction value of zero when the transaction is completed.

20. A system for providing multiple level discounts on a price-per-unit (PPU) of a consumable good sold in multiple units to a customer who purchases a plurality of cross-marketed products, said system comprising:

a discounts issued database for storing discounts;

means for calculating a first discount on the PPU of the consumable good in response to a purchase by a customer of a first cross-marketed product;

means for calculating a second discount on the PPU of the consumable good in response to a purchase by the customer of a second cross-marketed product; and a database controller which adds the first discount to the second discount to determine a total discount for the customer on the PPU of the consumable good.

21. The system for providing multiple level discounts of claim 20 wherein the database controller includes means for adding a first discount from a first merchant to a second discount from a second merchant.

22. The system for providing multiple level discounts of claim 21 wherein the consumable good is gasoline, and the first, second, and total discounts are discounts on the price-per-unit-volume of gasoline.

23. The system for providing multiple level discounts of claim 22 further comprising:

a point of sale (POS) terminal that determines the first discount and issues an electronic coupon to the customer, said coupon providing a unique customer identification and a unique discount identification; and transmission means for transmitting the unique customer identification and the discount identification from the POS terminal to the discounts issued database.

24. A system for providing a discount on a price-per-unit (PPU) of a consumable good sold in multiple units to a customer who purchases at least one cross-marketed product, said system comprising:

a point of sale (POS) terminal that awards a first discount on the PPU of the consumable good to the customer in response to a purchase by the customer of a first cross-marketed product, said POS terminal including means for issuing a coupon to the customer, said coupon providing a unique customer identification and a transaction identification;

means for sending the first discount from the POS terminal to a discounts issued database which associates the first discount with the unique customer identification and the transaction identification;

an input device for inputting by the customer in a subsequent transaction, the unique customer identification and the transaction identification;

a database controller that retrieves the first discount from the discounts issued database; and means for reducing the PPU of the consumable good by the first discount in response to instructions from the database controller.

25. The system for providing a discount on a PPU of a consumable good of claim 24 wherein the POS terminal also includes means for awarding a second discount on the PPU of the consumable good to the customer in response to a purchase by the customer of a second cross-marketed product, and the database controller includes means for adding the first discount to the second discount to determine a total discount on the PPU of the consumable good.

26. A system for providing a price-per-unit-volume discount on gasoline to a customer who purchases a cross-marketed product in a sales transaction, said system comprising:

a point of sale (POS) terminal comprising:
means for awarding the price-per-unit-volume discount to the customer in response to a purchase by the customer of a cross-marketed product; and
means for issuing an electronic coupon to the customer, said coupon uniquely identifying the customer and the sales transaction;

a discounts issued database for storing the price-per-unit-volume discount and uniquely associating the discount with the customer and sales transaction;

transmission means for sending from the POS terminal to the discounts issued database, a maximum number of volume units of gasoline to which the discount is applied, and a minimum purchase of gasoline required in order to qualify for the discount;

an input device at a gasoline dispenser at a gas station for entering a unique customer identification and a transaction identification;

a database controller for retrieving the price-per-unit-volume discount from the discounts issued database, upon associating the unique customer identification and the transaction identification with the stored price-per-unit-volume discount;

means for reducing, by the gasoline station, the price-per-unit-volume of the gasoline by an amount equal to the discount;

means within the database controller for determining a value of the total discount redeemed, verifying that the value of the total discount redeemed is less than or equal to the maximum discount allowed, and verifying that the amount of gasoline purchased is greater than or equal to the minimum purchase required to qualify for the discount; and a discounts redeemed database for storing the value of the discount redeemed.

27. The system for providing a price-per-unit-volume discount on gasoline of claim 26 further comprising a residual value database for storing a residual discount, and wherein the database controller also includes:

means for retrieving the residual discount from the residual value database; and means for adding the residual discount to the price-per-unit-volume discount.

* * * * *